(12) United States Patent
Phillips

(10) Patent No.: US 7,513,188 B2
(45) Date of Patent: Apr. 7, 2009

(54) FORCE-BASED POWER STEERING SYSTEM

(75) Inventor: Edward H. Phillips, Troy, MI (US)

(73) Assignees: ArvinMeritor Technology, LLC, Troy, MI (US); Techco Corp., Southfield, MI (US)

( * ) Notice: Subject to any disclaimer, the term of this patent is extended or adjusted under 35 U.S.C. 154(b) by 252 days.

(21) Appl. No.: 11/247,970

(22) Filed: Oct. 11, 2005

(65) Prior Publication Data

US 2006/0086087 A1    Apr. 27, 2006

Related U.S. Application Data

(60) Provisional application No. 60/617,724, filed on Oct. 8, 2004.

(51) Int. Cl.
*F15B 11/10* (2006.01)

(52) U.S. Cl. ........................................................ 91/433
(58) Field of Classification Search .................. 91/433
See application file for complete search history.

(56) References Cited

U.S. PATENT DOCUMENTS

| | | | |
|---|---|---|---|
| 4,509,611 A | 4/1985 | Kade et al. | |
| 4,653,601 A | 3/1987 | Nakamura et al. | |
| 4,715,461 A | 12/1987 | Shimizu | |
| 4,724,810 A | 2/1988 | Poirer et al. | |
| 4,753,310 A | 6/1988 | Hashimoto | |
| 4,757,869 A | 7/1988 | Morishita et al. | |
| 4,828,065 A | 5/1989 | Ishihara et al. | |
| 4,855,655 A | 8/1989 | Shimizu | |
| 4,926,956 A | 5/1990 | Duffy | |
| 4,946,001 A | 8/1990 | Taniguchi et al. | |
| 5,029,660 A | 7/1991 | Raad et al. | |
| 5,076,381 A | 12/1991 | Daido et al. | |
| 5,151,860 A | 9/1992 | Taniguchi et al. | |
| 5,198,981 A | 3/1993 | Collier-Hallman et al. | |
| 5,202,830 A | 4/1993 | Tsurumiya et al. | |
| 5,224,564 A | 7/1993 | Duffy | |
| 5,257,828 A | 11/1993 | Miller et al. | |
| 5,259,473 A | 11/1993 | Nishimoto | |
| 5,307,892 A | 5/1994 | Phillips | |
| RE34,746 E | 10/1994 | Schutters et al. | |
| 5,449,186 A | 9/1995 | Gerl et al. | |
| 5,473,231 A | 12/1995 | McLaughlin et al. | |

(Continued)

FOREIGN PATENT DOCUMENTS

EP        0515052        11/1992

(Continued)

OTHER PUBLICATIONS

Yeaple Fluid Power Design Handbook, pp. 84-89, C 1996.*

(Continued)

*Primary Examiner*—F. Daniel Lopez
(74) *Attorney, Agent, or Firm*—Carlson, Gaskey & Olds

(57) ABSTRACT

A power steering system includes a power cylinder, an accumulator, a reservoir, a pair of valves, and a pair of pressure transducers. The system selectively fluidly couples the accumulator and/or reservoir to the double-acting power cylinder and thereby causes the power steering system to function in the manner of a force-based power steering system.

1 Claim, 6 Drawing Sheets

U.S. PATENT DOCUMENTS

| | | | |
|---|---|---|---|
| 5,473,539 A | 12/1995 | Shimizu et al. | |
| 5,505,275 A | 4/1996 | Phillips | |
| 5,544,715 A | 8/1996 | Phillips | |
| 5,659,473 A | 8/1997 | Noro et al. | |
| 5,725,023 A | 3/1998 | Padula | |
| 5,732,373 A | 3/1998 | Endo | |
| 5,845,222 A | 12/1998 | Yamamoto et al. | |
| 5,931,256 A | 8/1999 | Langkamp | |
| 5,936,379 A | 8/1999 | Matsuoka | |
| 5,953,978 A | 9/1999 | Bohner et al. | |
| 6,152,254 A | 11/2000 | Phillips | |
| 6,250,416 B1 | 6/2001 | Pluschke et al. | |
| 6,370,459 B1 | 4/2002 | Phillips | |
| 6,779,558 B1 * | 8/2004 | Bruck et al. | 91/433 |
| 6,945,352 B2 | 9/2005 | Phillips | |
| 2004/0238260 A1 | 12/2004 | Phillips | |

FOREIGN PATENT DOCUMENTS

| | | |
|---|---|---|
| FR | 2714010 | 6/1995 |
| JP | 4-353189 | 12/1982 |
| JP | 05 244652 | 2/1992 |
| JP | 5-279706 | 11/1993 |
| JP | 5-282782 | 11/1993 |

OTHER PUBLICATIONS

U.S. Patent Application: "Force-Based Power Steering System", U.S. Appl. No. 11/252,989, filed Oct. 18, 2005.

U.S. Patent Application: "Inherently Failsafe Electric Power Steering System", U.S. Appl. No. 11/258,607, filed Oct. 25, 2005.

U.S. Patent Application: "Hydro-Mechanically Coupled Electric Power Steering System", U.S. Appl. No. 11/205,289, filed Aug. 16, 2005.

"Hydraulic Control Systems" by Herbert E. Merritt, copyright 1967, pp. 87, 99-101, 193.

* cited by examiner

FORCE-BASED POWER STEERING SYSTEM

This application claims priority to U.S. Provisional Application Ser. No. 60/617,724, filed Oct. 8, 2004.

BACKGROUND OF THE INVENTION

The present invention relates generally to power steering systems for vehicles, and more particularly to an energy efficient power steering system intended particularly for medium to large vehicles.

Virtually all present power steering systems comprise implementation means whose fundamental output is force based. By way of example, present art power steering systems generally comprise a common open-center valve that delivers differential pressure to a double-acting power cylinder as a function of torque applied to a steering wheel. This is accomplished via torque applied to the steering wheel progressively closing off return orifices comprised within the open-center valve. Another example is an electric power steering system (hereinafter "EPS system") wherein a servomotor delivers torque to the steering gear as a function of current applied to it by a controller. An EPS system of particular interest herein is described in U.S. Pat. No. 6,152,254, entitled "Feedback and Servo Control for Electric Power Steering System with Hydraulic Transmission," issued Nov. 28, 2000 to the present inventor, wherein differential pressure is directly delivered to a double-acting power cylinder from a servomotor driven reversible fluid pump. In view of continued reference hereinbelow to the '254 patent, the whole of that patent is expressly incorporated by reference herein.

While the EPS system described in the incorporated '254 patent has optimum performance characteristics, it like all EPS systems is limited in utilization to relatively small vehicles because of limited available electrical power. All vehicle manufacturers limit electrical current availability for EPS systems to a value that can be supplied directly from an alternator. A limiting value of perhaps 70 Amperes from a 12 Volt electrical system is typical. At a lower limiting voltage value of 10 Volts and an overall EPS system efficiency of perhaps 60% this results in a net maximum power delivery from the steering gear of only 420 Watts. This low value stands in stark contrast to known future power steering system requirements ranging as high as 3,500 Watts.

Various so-called "closed-center" power steering systems have been proposed as a solution to this problem. Such closed-center power steering systems utilize an accumulator to store power steering fluid at relatively high pressure. Some form of closed-center valving is then used to meter a flow of pressurized fluid to one end of a double-acting power cylinder while concomitantly permitting a similar return flow of low-pressure fluid from the other end thereof to a reservoir. Generally, pressurized fluid is supplied to the accumulator from the reservoir by a relatively small displacement pump driven by a simple (e.g., non-servo) motor controlled by a pressure-activated switch.

To date however, none of the proposed closed-center power steering systems has provided acceptable on-center steering "feel" and they have not gained acceptance in the industry. It is believed herein that the primary problem with the closed-center power steering systems proposed to date is that their fundamental output is fluid flow or rate-based rather than force-based as is described above with reference to currently accepted power steering systems. The fundamental problem with the rate-based closed-center systems is that they provide nominally linear control of system velocity with inherent discontinuities in system acceleration, while on the other hand, the force-based systems directly provide linear control of system acceleration. It is believed herein that these discontinuities in system acceleration are the root cause of the unacceptable on-center steering feel in the closed-center power steering systems.

Therefore, it would be highly advantageous to provide an accumulator enabled power steering system that has the acceptable on-center steering "feel" provided by a force-based power steering system. Such a force-based power steering system is disclosed in U.S. Pat. No. 6,945,352, issued Sep. 20, 2005 to the present inventor, which is hereby incorporated by reference in its entirety. The present invention further defines a simplified version of the force-based power steering system disclosed in the '352 Patent.

SUMMARY OF THE INVENTION

An accumulator enabled power steering system according to the present invention provides a simplified method and apparatus for enabling the accumulator enabled power steering system of the present invention to function in the manner of a force-based power steering system.

The accumulator enabled power steering system includes an accumulator and an electronically controlled pair of first and second three-way critically-lapped normally open servo valves. Input grooves in valve spools of both servo valves are fluidly connected to the accumulator and return grooves thereof are fluidly connected to a reservoir. The output grooves thereof are respectively fluidly connected to first and second ports of a double-acting power cylinder. The valve spools are spring-loaded in accordance with their designation of being "normally open" such that each of their output grooves and therefore the ports of the double-acting power cylinder are normally fluidly connected to their return grooves and therefore the reservoir.

A steering wheel torque transducer provides an applied torque signal $V_{at}$ indicative of polarity and values of torque applied to a steering wheel. Respective first and second pressure transducers provide respective first and second pressure signals indicative of pressure values respectively present at the first and second ports of the power cylinder. A controller provides a power control signal $V_c$ to the one of the servo valves selected in accordance with the polarity of the applied torque signal $V_{at}$ at values determined via filtering and amplifying an error signal $V_e$, which error signal $V_e$ is generated by the difference between a control function signal $V_{cf}$ determined by a control algorithm from at least the applied torque signal $V_{at}$ and a pressure signal $V_p$ issued by the respective pressure transducer for controlling that servo valve such that pressurized fluid is supplied to the respective port of the power cylinder at fluid pressure values that in turn continually reduce the error signal $V_e$, and thus provide pressurized fluid to that port of the power cylinder in accordance with the control algorithm determined control function signal $V_{cf}$.

The accumulator is initially and then intermittently charged with fluid such that the accumulator fluid pressure is always greater than a selected threshold value exceeding that required for executing any likely steering load. Operationally, whenever torque is applied to the steering wheel, an applied torque signal $V_{at}$ is sent to the controller by the torque transducer. First, the controller selects the appropriate one of the servo valves to be controlled in accordance with the polarity of the applied torque signal $V_{at}$. Then the absolute value of the applied torque signal $V_{at}$ is multiplied by a control function constant $K_{cf}$ to form the control function signal $V_{cf}$. The control function constant $K_{cf}$ is determined by the above mentioned control algorithm as a selected function of the applied torque value, and in addition, most likely at least the vehicular speed in accordance with procedures fully explained in the incorporated '254 patent.

The pressure signal $V_p$ from the respective pressure transducer is then subtracted from the control function signal $V_{cf}$ whereby the resulting algebraic sum forms the error signal $V_e$. The error signal $V_e$ is then filtered and amplified to form the power control signal $V_c$ that is then used to control the selected three-way critically-lapped servo valve whereby appropriately pressurized fluid is provided to the respective cylinder port in order to apply steering force to the dirigible (steerable) wheels of the host vehicle in accordance with the control algorithm determined control function signal $V_{cf}$ that is of course selectively representative of torque applied to the steering wheel. Such critically-lapped servo valves and their operative characteristics are thoroughly described in a book by Herbert E. Merritt entitled "Hydraulic Control Systems" and published by John Wiley & Sons, Inc. of New York.

It is desirable for working pressures in the power cylinder to always be kept at the lowest pressure values possible. This keeps pressure values applied to various power cylinder seals to a minimum thereby reducing leakage problems and minimizing Coulomb friction. The spring-loaded valve spools in each of the normally open three-way servo valves automatically provide this desirable characteristic because they have no applied power control signal and are thereby positioned in their normally open positions. Therefore, the respective cylinder port is fluidly connected to its return groove and the reservoir.

In addition, it is also desirable to fluidly couple both of the left and right cylinder ports to the reservoir during "on-center" steering conditions. This improves overall system efficiency by allowing small on-center steering motions to be effected without using any accumulator-sourced fluid. In the accumulator enabled power steering system of the present invention this is automatically accomplished by configuring the control algorithm such that the control function constant $K_{cf}$ has zero values for small near on-center values of torque applied to the steering wheel. This in turn results in both of the normally open three-way valves having zero valued power control signals for small near on-center values of torque applied to the steering wheel whereby both cylinder ports are fluidly connected to the reservoir.

Overall system accuracy and stability is provided via controlling the accumulator enabled power steering system via a feedback control loop implemented with reference to the pressure signal $V_p$ representative of actual fluid pressure values present at the one of the first and second cylinder ports corresponding to the instant polarity of the applied torque signal $V_{at}$. Because this type of control technique is described in detail in the incorporated '254 patent, it will not be repeated in full detail herein.

The present invention also provides a method for enabling the accumulator enabled power steering system. The method includes determining polarity and measuring torque applied to the steering wheel. One fluidly connected sub-system having a three-way servo valve, a respective pressure transducer and a respective power cylinder port is selected in response to the polarity. A desired pressure value to be applied to the selected power cylinder port as a selected function of at least the applied torque value is determined. The pressure value actually present at the selected power cylinder port is also determined. The signal representative of the actual pressure value is subtracted from the signal representative of the desired instant pressure value to form an error signal, which is filtered and amplified to form a power control signal. The respective one of the three-way servo valves is operated in response to the power control signal so as to continually reduce the error signal and thus provide the desired pressure value to the corresponding one of the first and second ports of the doubleacting power cylinder.

Because of its improved steering feel and ability to service known future power steering systems whose net hydraulic power requirements range as high as 3,500 Watts, a power steering system configured according to the present invention possesses distinct advantages over known prior art power steering systems able to handle such large steering loads. For example, the power steering system of the present invention provides dramatically improved system efficiency when compared to standard hydraulic power steering systems utilizing engine driven pumps. Further, the power steering system of the present invention provides dramatically improved tactile feel when compared to known prior art accumulator and closed-center valve enabled power steering systems. Thus, the accumulator enabled power steering system of the present invention enables both efficient and tactilely acceptable power steering for medium to large vehicles.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
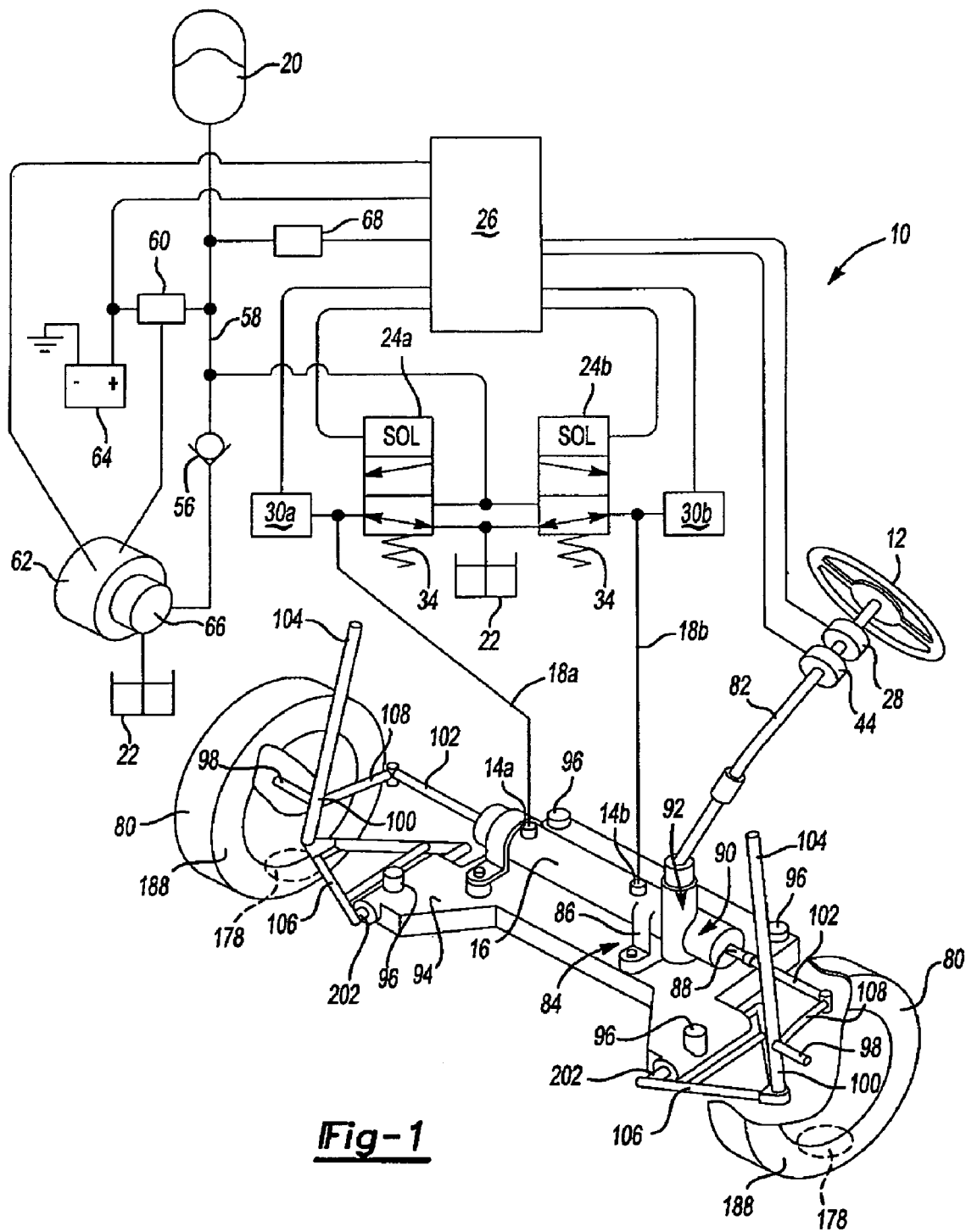
FIG. 1 is a combined isometric and schematic view of a portion of a host vehicle that comprises the accumulator enabled power steering system of the present invention.
Figure 2:
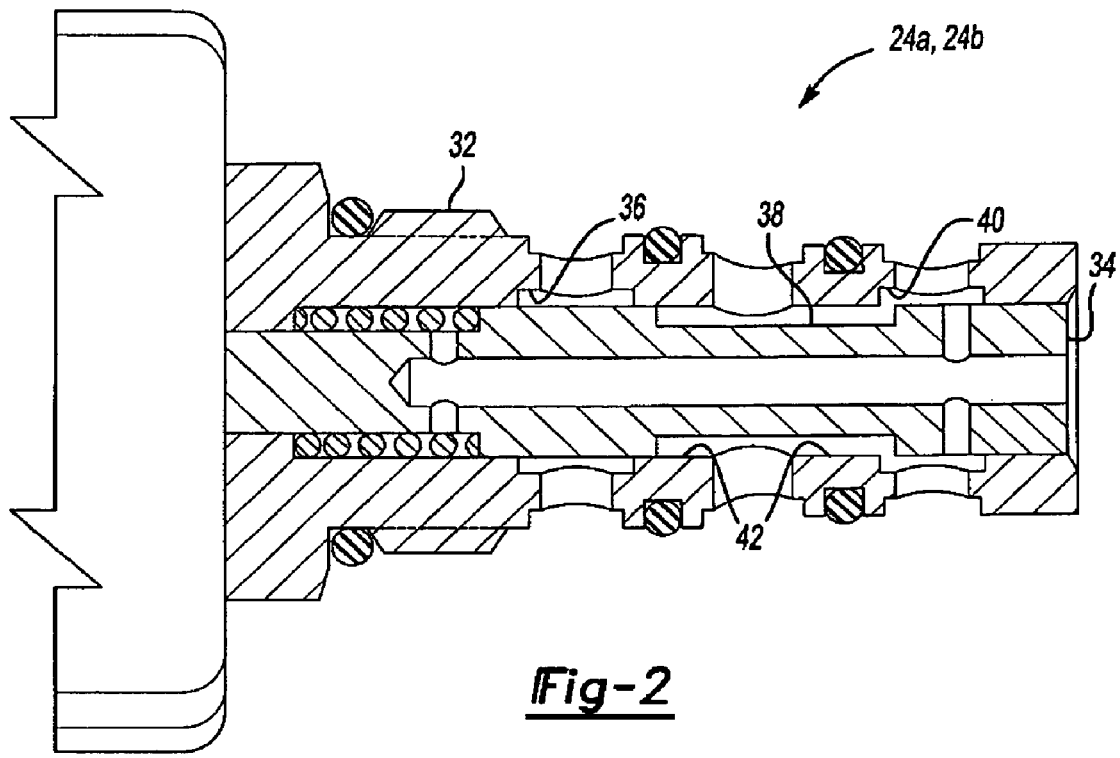
FIG. 2 is a sectional view of a three-way slightly over-lapped normally open servo valve utilized in the accumulator enabled power steering system of the present invention.
Figure 3:
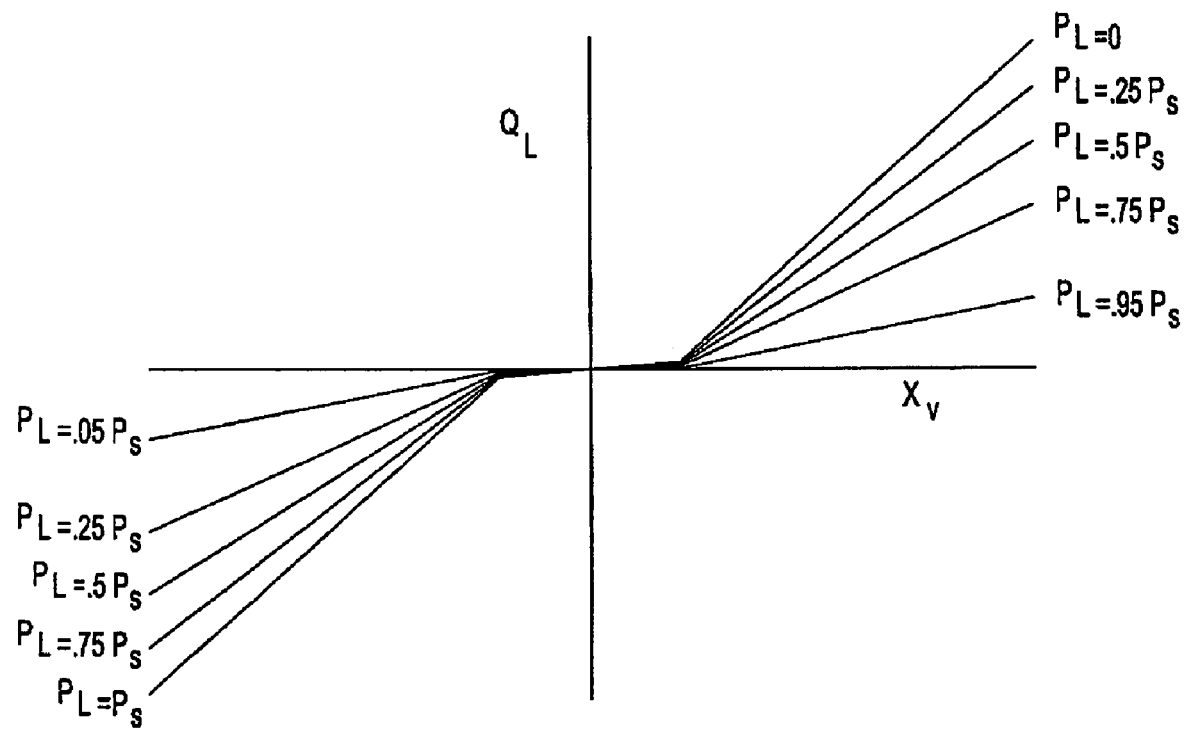
FIG. 3 is a graphical representation of flow delivery and return characteristics of the three-way slightly over-lapped normally open servo valve depicted in FIG. 2.

The present invention is directed to a simplified method and apparatus for enabling an accumulator enabled power steering system to function in the manner of a force based power steering system. With reference first to FIGS. 1, 2 and 3, there shown in perspective, schematic and sectional views are operative elements of an accumulator enabled power steering system 10 wherein torque applied by a driver to a steering wheel 12 results in pressurized fluid being conveyed to or from a selected one of a first port 14a and a second port 14b of a doubleacting power cylinder 16 via a respective one of a first fluid line 18a and a second fluid line 18b, and low pressure (hereinafter "reservoir pressure") fluid being conveyed from or to the other one of the first port 14a and the second port 14b via the other one of the first fluid line 18a and the second fluid line 18b. In order to maintain the pressurized fluid conveyed to or from a selected one of first port 14a and the second port 14b at selected pressure levels, controlled amounts of the pressurized fluid issuing from an accumulator 20 or returning to a reservoir 22 are metered to or from the selected one of the first fluid line 18a and the second fluid line 18b via a respective one of a first valve 24a and a second valve 24b in response to a power control signal $V_c$ issuing from a controller 26. The first valve 24a and the second valve 24b may be electronically controlled, three-way, critically lapped, normally open, servo valves.

The accumulator 20 is initially and then intermittently charged with pressurized fluid such that the accumulator fluid pressure is greater than a selected threshold value exceeding that required for meeting any likely steering load. Operationally, whenever torque is applied to the steering wheel 12, an applied torque signal $V_{at}$ is sent to the controller 26 by a torque transducer 28. First, a signal representative of the polarity of the applied torque signal $V_{at}$ is generated whereby a corresponding one of the first valve 24a and second valve 24b is selected for activation. Then as will be further described below, the absolute value of the applied torque signal $V_{at}$ is next multiplied by a control function constant $K_{cf}$ to form a control function signal $V_{cf}$ where the control function constant $K_{cf}$ is generated by the controller 26 as a function of at least the applied torque value, and most probably vehicular speed, in accordance with procedures fully explained in the incorporated '254 patent. A pressure signal $V_p$ is obtained from a respective one of a first pressure transducer 30a and a second pressure transducer 30b provided for measuring respective pressure values at the first port 14a and the second port 14b. The pressure signal $V_p$ is then subtracted from the control function signal $V_{cf}$ whereby the resulting algebraic sum forms an error signal $V_e$. The error signal $V_e$ is then filtered and amplified to form a power control signal $V_c$ that is then continuously applied to the selected one of the first valve 24a and the second valve 24b in such a manner as to cause the error signal $V_e$ to decrease in value.

With particular reference now to FIG. 2, the first valve 24a and the second valve 24b each include a valve sleeve 32 and a spring-loaded valve spool 34. As is conventional, the valve sleeve 32 and spring-loaded valve spool 34 are configured with a critically lapped set of grooves and lands including an input groove 36, an output groove 38 and a return groove 40. The output groove 38 is formed with slightly less axial length than that of the land 42 separating the input groove 36 and the return groove 40. As explained in detail in the book entitled "Hydraulic Control Systems," forming the valves 24a and 24b in a slightly overlapped manner results in them issuing a flow of pressurized fluid in a linear manner with reference to position of the spring-loaded valve spools 34 in either flow delivery or flow return modes as well as in a continuous manner at reduced slope through their valve null positions.

As depicted in FIG. 3 however, the slopes of flow delivery and flow return curves are in general different on either side of their valve null positions (e.g., other than for the special case where the load pressure $P_L$ is exactly half the supply pressure $P_s$). This is because their flow rates are substantially proportional to the product of their instant open orifice area and the square root of the instant pressure difference across their open orifices. For example, the slope of the delivery flow curve has a maximum value at the beginning of a steering event when the pertinent power cylinder pressure is near reservoir pressure—while the slope of the return flow curve has a minimum value at the end of a steering event as the pertinent power cylinder pressure again decreases to near reservoir pressure.

As further explained in detail in the book entitled "Hydraulic Control Systems," flow values in either of the delivery flow or return flow directions can be determine by $Q=70\ w \times \mathrm{Sqrt}[\mathrm{delta}P]$ where Q is flow rate, w is the circumference of the spring-loaded valve spool 34 and deltaP is pressure drop across the valve orifice. In addition, stroking force can be found by $F=0.0061\ \mathrm{Sqrt}[\mathrm{delta}P]Q+kx+F_0$ where F is the stroking force, and k and $F_0$ are the spring constant and force associated with the valve null positions of the spring-loaded valve spools 34. Finally, the valve flow gains in either direction can be defined as the ratio of flow to variable portions of the stroking force or $K_q=Q/(F-F_0)=1/(0.0061\ \mathrm{Sqrt}[\mathrm{delta}P]+k/(70\ w\ \mathrm{Sqrt}[\mathrm{delta}P]))$ where $K_q$ is valve flow gain. Thus, the flow-sourced portion becomes dominant at high values of pressure drop and the spring rate-sourced portion becomes dominant at low values of pressure drop. This results in minimum valve flow rate gain values occurring at the extremes and larger values perhaps 2 to 3 times larger occurring at moderate pressure drop values in between.

The transition between dissimilar flow delivery and flow return curve slopes is eased however, by virtue of the first valve 24a and the second valve 24b being configured in a slightly overlapped manner. As depicted in the book entitled "Hydraulic Control Systems," this would result in a zero slope, and thus zero valve gain, between so bifurcated critical positions of "ideal" such slightly over-lapped servo valves. This is not the case with practical three-way slightly overlapped servo first and second valves 24a and 24b however, because of their finite leakage characteristics. Thus, there is a smooth transition of valve gain through the bifurcated critical position region in the manner depicted in FIG. 3 (wherein the extent of the bifurcated critical position region has been exaggerated for illustrative purposes and $P_S$ is supply or accumulator pressure). Actually, it has been found that this eases the stability criterion for the accumulator enabled power steering system 10 because the most difficult stability problems typically occur during slowly implemented parking maneuvers involving transitions between the bifurcated critical positions. As depicted in FIG. 3, practical three-way slightly over-lapped servo valves effect this maneuver with their valve gains smoothly varying to low values through the bifurcated critical position region between delivery and return flow conditions.

Figure 4:
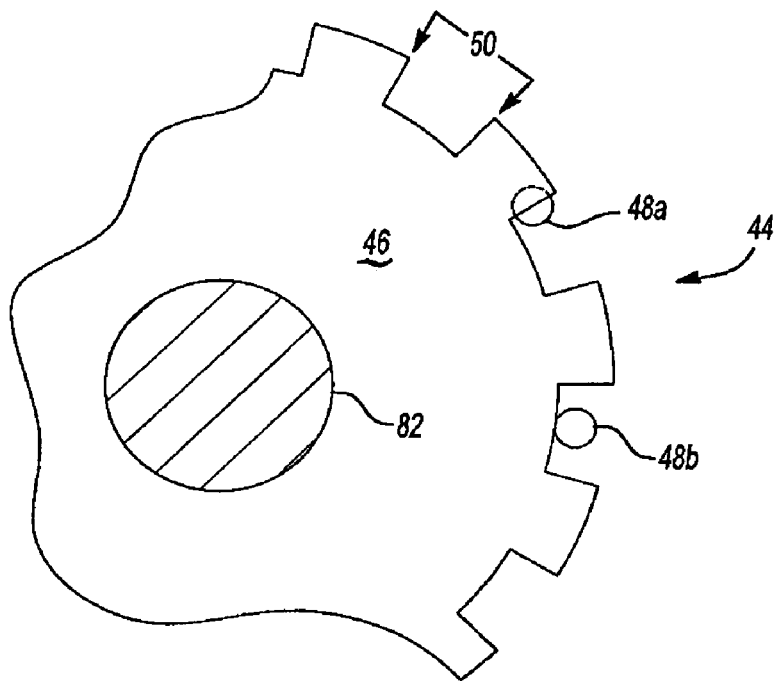
FIG. 4 is a sectional view of a portion of a steering wheel motion direction sensor utilized in the accumulator enabled power steering system of the present invention.

In most cases adequate control can be achieved without tailoring feedback filtering in accordance with instant deltaP values, or alternately, by limited such tailoring achieved through interpretation of which of the input groove 36 or return groove 40 is instantly in use via a combination of signals indicative of solenoid current and output pressure value. However, such tailoring may in some cases be desirable. In such cases, it is necessary to additionally provide the controller 26 with a signal indicative of the direction of fluid flow through the selected one of the first valve 24a and the second valve 24b in order for it to interpret which of the input groove 36 or return groove 40 is instantly being utilized. This of course requires additional means for determining the direction of fluid flow. Perhaps the easiest way to determine the direction of fluid flow is to take advantage of the obvious correlation between fluid flow direction and steering wheel motion by utilizing a steering wheel motion direction sensor 44 to determine the direction of rotational motion of the steering wheel and then convey a signal so indicative to the controller 26. As shown in FIG. 4, such a steering wheel motion direction sensor 44 comprises a shaft angle encoder disc 46 coupled to the steering wheel 12 via a steering shaft 82 for rotation therewith and sensors 48a and 48b positioned such that they sense the passage of each space 50 in quadrature one-to-another. This technique utilizes one of the sensors 48a or 48b to count the passage of a space 50 while the instant polarity indicated by the other sensor 48b or 48a during that count determines whether it is to be taken in an up or down direction and is of course well known in the electronics industry.

It is desirable for working pressures in the double-acting power cylinder 16 to always be kept at the lowest pressure values possible. This keeps pressure values applied to various power cylinder seals to a minimum thereby reducing leakage problems and minimizing Coulomb friction. The spring-loaded valve spools 34 comprised in each of the normally open three-way servo valves 24a and 24b automatically provide this desirable characteristic because the spring-loaded valve spool 34 comprised in the three-way servo valve 24a or 24b having no applied power control signal $V_c$ is positioned in its normally open position whereat its output groove 38, and therefore the respective port 14a or 14b of the double-acting power cylinder 16, is fluidly connected to its return groove 40 and therefore to the reservoir 22.

In addition, it is also desirable to fluidly couple both of the first port 14a and the second port 14b to the reservoir during "on-center" steering conditions. This improves overall system efficiency by allowing small on-center steering motions to be effected without using any accumulator-sourced fluid as well as providing preferred on-center "feel." In the accumulator enabled power steering system 10 this is automatically accomplished by configuring the control algorithm such that the control function constant $K_{cf}$ has zero values for small near on-center values of torque applied to the steering wheel 12. This in turn results in both of the first valve 24a and the second valve 24b having zero valued power control signals $V_{c1}$, and $V_{c2}$ for small near on-center values of torque applied to the steering wheel 12 whereby both the first port 14a and the second port 14b are fluidly connected to the reservoir 22. Furthermore, since both the first port 14a and the second port 14b are fluidly connected to the reservoir 22 under this condition, it is an optimum time for the controller 26 to calibrate both of the first pressure transducer 30a and the second pressure transducer 30b to a zero value by resetting the signals $V_{p1}$ and $V_{p2}$ to a zero state. This can be accomplished every time the applied torque signal $V_{at}$ has a zero value thus guaranteeing maximum pressure measurement accuracy during the next steering maneuver.

Figure 5A:
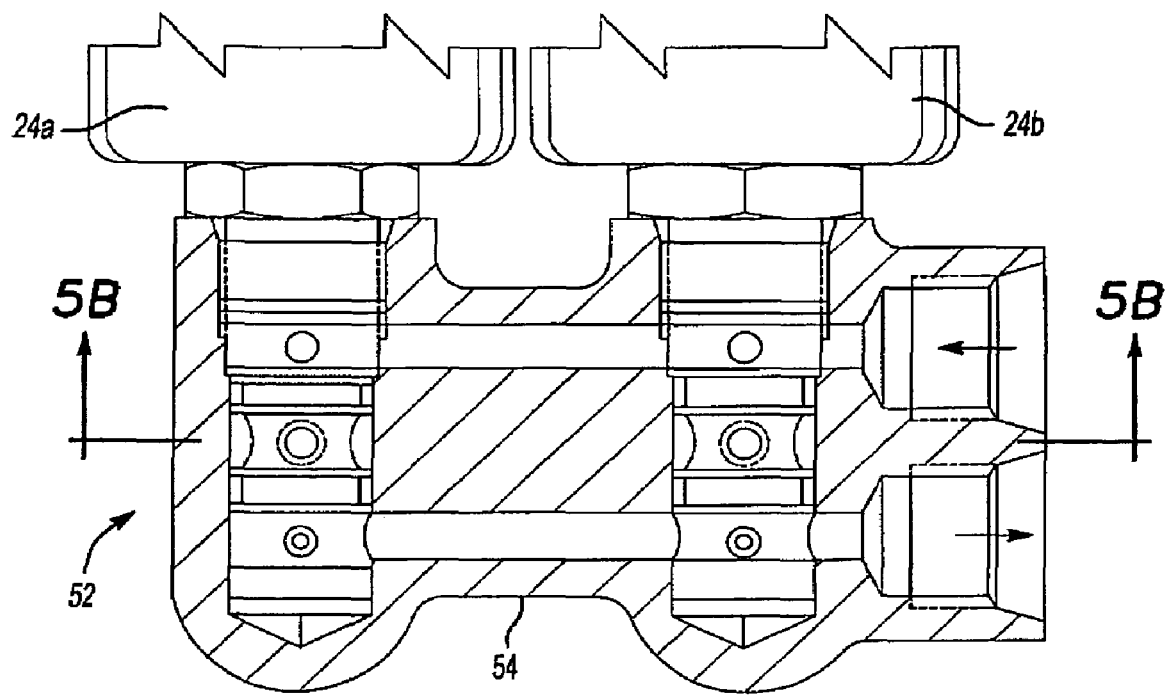
FIGS. 5A and 5B are sectional views of a hydraulic control assembly utilized in the accumulator enabled power steering system of the present invention.
Figure 5B:
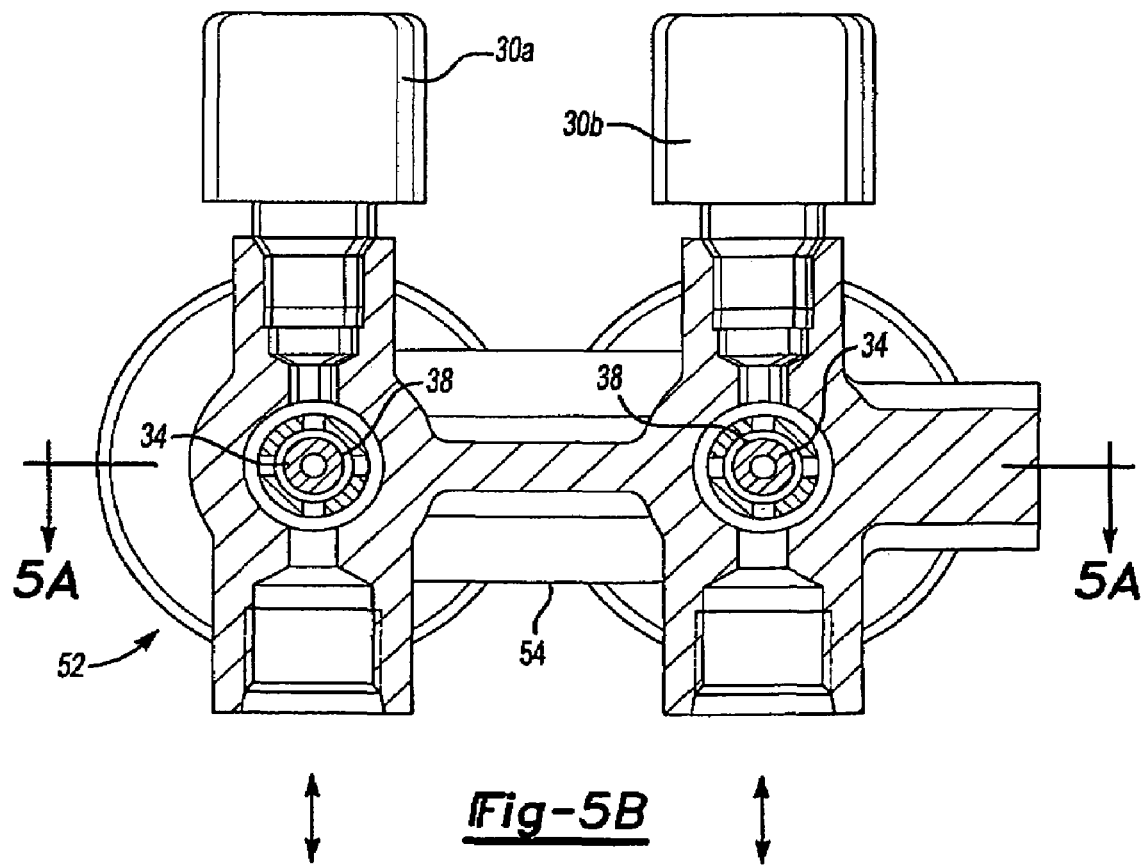

For convenience it is appropriate to package the first valve 24a and the second valve 24b together with the first pressure transducer 30a and the second pressure transducer 30b in a single pressurized fluid control assembly 52. Thus with reference now to FIGS. 5A and 5B, there shown is a pressurized fluid control assembly 52 comprising the first valve 24a and the second valve 24b and the first pressure transducer 30a and the second pressure transducer 30b commonly mounted on a manifold 54 (electrical connections not shown).

A fluid source must of course be provided for charging the accumulator 20 with pressurized fluid. An electrically driven fluid source can be utilized for this purpose as is indicated in alternate forms in FIG. 1. A pressure-activated switch 60 can be utilized to electrically couple a drive motor 62 to a battery 64 whereby the drive motor 62 drives a pump 66 that then pumps fluid from the reservoir 22 to the accumulator 20 via a check valve 56 and supply line 58 in perhaps the simplest version. This would require the use of a brush-type DC drive motor of course. Alternately, a brushless type of drive motor can be utilized via provision of a pressure sensor 68 sending a signal indicative of the instant supply pressure (e.g., accumulator pressure) to the controller 26 and the controller 26 coupling a brushless type drive motor 62 to the battery 64 via inverter circuitry (not shown). In either case, this continues until a de-activation pressure level is reached whereat the drive motor 62, and therefore the pump 66, are stopped. The check valve 56 is then utilized for preventing back flow to the reservoir 22 via leakage through the pump 66.

On the other hand, it may be desired to maintain the supply pressure in the accumulator 20 at a nominally constant value in order to maintain the consistent gain characteristics for the electronically controlled three-way servo valves 24a and 24b depicted in FIGS. 3A and 3B. In this case, the drive motor 62 is configured as a variable speed drive motor driven by a controlled power signal issuing from the controller 26 such that the drive motor 62 and pump 66 function as part of a relatively simple servo system for maintaining the supply pressure at a preselected nominal value.

Figure 6A:
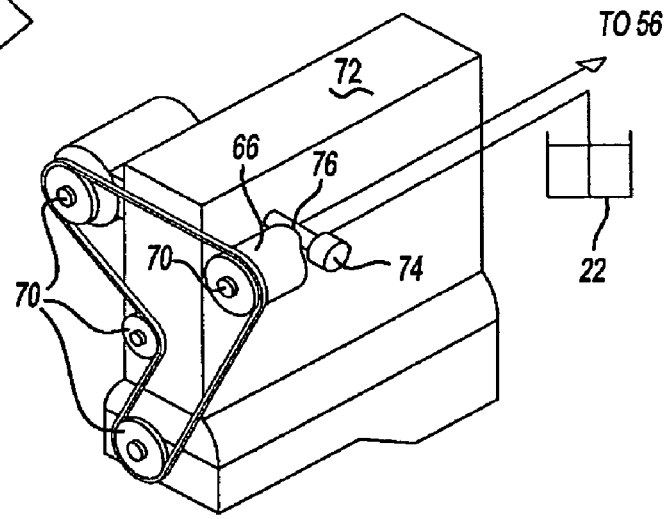
FIGS. 6A and 6B are combined isometric and schematic views of alternate apparatus for providing pressurized fluid to an accumulator comprised in the accumulator enabled power steering system of the present invention.
Figure 6B:
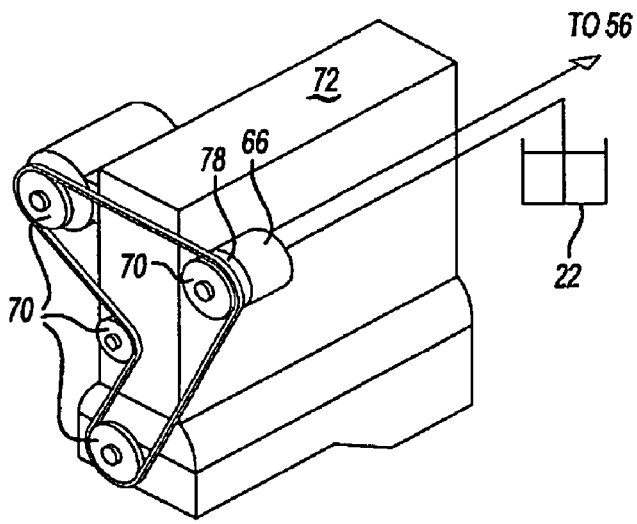

Alternately, an accessory drive train 70 of the engine 72 of the host vehicle can be directly utilized to mechanically drive the pump 66 in the manner depicted in either of FIG. 6A or 6B. The required intermittent functional operation of the pump 66 can be accomplished by utilizing an electronically controlled two-way valve 74 for closing a bypass passage 76 in order to force the pumped and thereby pressurized fluid to flow through the check valve 56 as shown I FIG. 6A. Or as depicted in FIG. 6B, an electrically activated clutch 78 similar to those commonly utilized for automotive air conditioning compressors can be used to intermittently couple the accessory drive train 70 to the pump 66.

With reference again to FIG. 1, the accumulator enabled power steering system 10 is there shown in conjunction with various mechanical components of the host vehicle in which the accumulator enabled power steering system 10 is located. More particularly, a driver rotates the steering wheel 12 in order to steer the dirigible wheels 80 of the host vehicle. The steering wheel 12 is connected to the dirigible wheels 80 by the steering shaft 82 connected to a suitable steering gear 84, for example of the rack-and-pinion type, contained in a steering gear housing 86 wherein a rack 88 is mechanically driven by a pinion (not shown). In addition as viewed from the steering shaft 82, the steering gear 84 comprises a torsionally compliant member (also not shown). This torsionally compliant member is usually a torsion bar. For convenience, the pinion and the torsion bar will hereinafter be referred to as "the pinion 90" and "the torsion bar 92," respectively.

As is conventional, application of an applied steering torque $T_s$ to the steering wheel 12 results in application of an assisted steering force to the dirigible wheels 80. More particularly, the rack 88 is partly contained within a portion of the steering gear housing 86 comprising the double-acting power cylinder 16. The steering gear housing 86 is in turn fixed to a conventional steering assembly sub-frame 94. The steering assembly sub-frame 94 includes a plurality of mounts 96 for connecting the steering assembly sub-frame 94 to the vehicle chassis (not shown). The dirigible wheels 80 are rotatably carried on wheel spindles 98 connected to the rack 88 via steering knuckles 100 and tie rods 102, and pivotally connected to the host vehicle's chassis and/or steering assembly sub-frame 94 via vehicle struts 104 and lower control arms 106. A portion 108 of each steering knuckle 100 defines a knuckle arm radius about which the assisted steering force, comprising both mechanically derived steering force and powered assist to steering as respectively provided by a pinion-rack interface (not shown) and the double-acting power cylinder 16, is applied.

Figure 7:
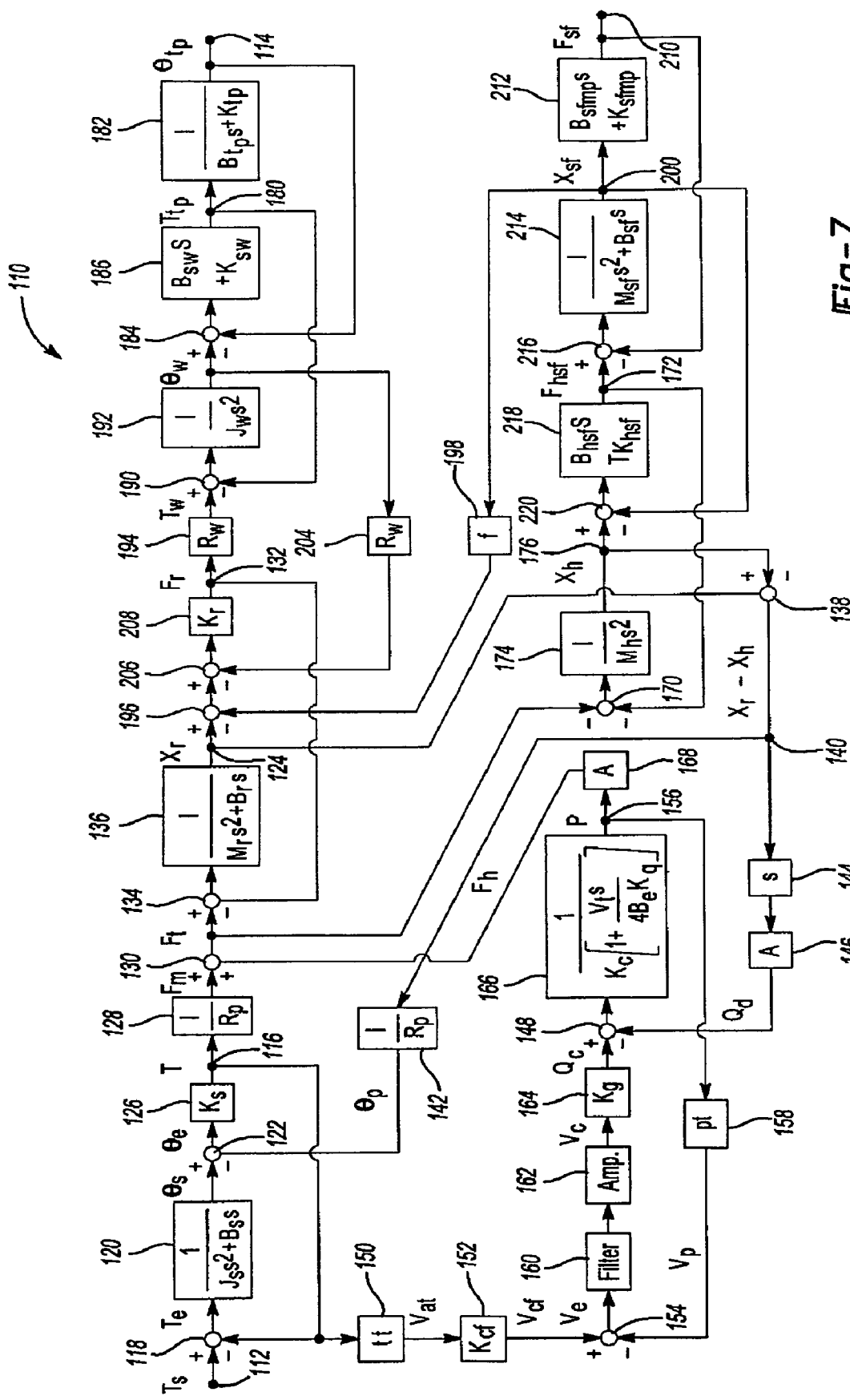
FIG. 7 is a block diagram representing various mechanical, hydraulic and electronic connections and relationships existing in any host vehicle comprising the accumulator enabled power steering system of the present invention.

With reference now to FIG. 7, there shown is a block diagram 110 that is helpful in understanding various mechanical and hydraulic connections and relationships existing in the host vehicle. These connections control the dynamic linkage between steering wheel torque $T_s$ applied by a vehicle operator to the steering wheel, and the resulting output tire patch steering angle $Theta_{tp}$.

The block diagram 110 is also useful in that it allows an assessment of the response to a perturbation arising anywhere between the system input (here, the applied steering wheel torque $T_s$) at input terminal 112 and the system output (here the steering angle or dirigible wheel tire patch angle $Theta_{tp}$) at output terminal 114. Therefore, while the block diagram 110 will be described in a forward direction from the input terminal 112 to the output terminal 114 (a direction associated with actually steering the vehicle), concomitant relationships in the other directions should be assumed to be present. However, detailed descriptions of such opposite, concomitant relationships are omitted herein for the sake of brevity.

In any case, an applied steering torque T present at terminal 116 and representative of actual torque applied to the torsion bar 92 is subtracted from $T_s$ at a summing point 118. That algebraic sum yields an "error torque" $T_e$, which in this case is the available torque for accelerating the moment of inertia of the steering wheel 12. $T_e$ is then divided by (or rather, multiplied by the reciprocal of) the sum of a moment of inertia and damping term ($J_s s^2 + B_s s$) of the steering wheel 12 at block 120 where Js is the moment of inertia of the steering wheel, $B_s$ is steering shaft damping and s is the Laplace variable. The multiplication at the block 120 yields a steering wheel angle Theta, which serves as the positive input to another summing point 122. The negative input to the summing point 122 is a pinion feedback angle Theta, derived in part from the linear motion X, of the rack 88 at a terminal 124 described below. The summing point 122 yields an error angle $Theta_e$, which when multiplied by the stiffness $K_s$ (at block 126) of the combined steering shaft 82 and torsion bar 92 connecting the steering wheel 12 to the pinion 90 gives the applied steering torque T (at terminal 116) that is substantially present anywhere along the steering shaft 82 and at the pinion 90. $K_s$ can be considered as a series gain element in this regard. T is fed back from terminal 116 for subtraction from $T_s$ at the summing point 118 in the manner described above. Division of T by the pitch radius $R_p$ of the pinion 90 at block 128 (or rather, multiplication by its reciprocal) gives the mechanical force $F_m$ applied to the rack 88 via the pinion 90.

The total steering force $F_t$ applied to the rack 88 is generated at summing point 130 and is the sum of the mechanical force $F_m$ applied to the rack 88 via the pinion 90 and a hydraulic force $F_h$ provided by the hydraulic assist of the particular system modeled by the block diagram 110. The hydraulic force $F_h$ is derived from the applied steering torque T (again, supplied from terminal 116) in a manner described in more detail below. In any case, the hydraulic force $F_h$ is summed with the mechanical force $F_m$ at summing point 130 to yield the total force $F_t$ in the manner indicated above.

Force applied to the effective steering linkage radius, $F_r$, taken at terminal 132 is subtracted from the total force $F_t$ at a summing point 134. The resulting algebraic sum ($F_t - F_r$) from the summing point 134 is divided by (or rather, multiplied by the reciprocal of) a term ($M_r s^2 + B_r s$) at block 136, where $M_r$ relates to the mass of the rack 88 and $B_r$ is a parallel damping coefficient term associated with motion of the rack 88. The resulting product is the longitudinal motion $X_r$ of the rack 88 at terminal 124. $X_r$ is supplied as the positive input to a summing point 138, from which the lateral motion $X_h$ of the steering gear housing 86 is subtracted. The algebraic sum ($X_r - X_h$) taken at terminal 140 is divided by (or rather, multiplied by the reciprocal of) the pinion radius $R_p$ at block 142 to yield a rotational feedback angle $Theta_r$ which serves as the negative input to the summing point 122 as described above.

A time based derivative of the algebraic sum ($X_r - X_h$) is taken at block 144 and then multiplied by power cylinder piston area A at block 146 to obtain a damping fluid flow $Q_d$ which is supplied as a negative input to summing point 148. Concomitantly, the applied steering torque T present at terminal 116 is detected by the torque transducer 28 (at block 150) to obtain an applied torque signal $V_{at}$. The applied torque signal $V_{at}$ is then multiplied by a control function constant $K_{cf}$ at block 152 to obtain a control function signal $V_{cf}$ that in turn is supplied as the positive input to summing point 154.

As explained above, either set of the first valve 24a or the second valve 24b and the respective first pressure transducer 30a or second pressure transducer 30b is selected as the operative set thereof in accordance with the polarity of the applied torque signal $V_{at}$. Thus in general, the higher valued cylinder pressure P at terminal 156 is detected by that pressure transducer 30a or 30b, which pressure transducer is the one represented at block 158 in order to obtain feedback pressure signal $V_p$ which is then supplied as the negative input to summing point 154. The error signal $V_e$ formed by the algebraic sum ($V_{cf} - V_p$) is filtered (which operation involves multiplying by the inverse of the instant servo valve gain as is preferably accomplished via software control means within the controller 26) at block 160 and amplified at block 162 to obtain a power control signal $V_c$. The power control signal $V_c$ is then multiplied by the instant valve flow gain factor $K_q$ (e.g., in accordance with the discussion relating to FIG. 4) at block 164 to obtain a controlled flow $Q_c$ that in turn is supplied as the positive input to summing point 148. The algebraic sum ($Q_c - Q_d$) is next divided by (or rather, multiplied by the reciprocal of) an effective valve flow constant $K_c [1+(V_t s)/(4 B_e K_c)]$ (e.g., indicative of the flow characteristics of the selected electronically controlled three-way servo valve 24a or 24b) at block 166 to obtain the cylinder pressure P at terminal 156, where $K_c$ is the valve flow constant, $V_t$ is total cylinder volume and $B_e$ is fluid bulk modulus. Finally, the cylinder pressure P is multiplied by the power cylinder piston area A at block 168 to obtain the hydraulic force $F_h$.

The lateral motion $X_h$ of the steering gear housing 86 depends upon $F_r$. More particularly, $F_t$ is a negative input to a summing point 170, from which a force $F_{hsf}$ present at terminal 172 (e.g., applied to the steering assembly sub-frame 94 as a housing-to-sub-frame force) is subtracted. The lateral housing motion $X_h$ is then determined by the product of the algebraic sum ($-F_t - F_{hsf}$) and a control element $1/(M_h s^2)$ at block 174, where $M_h$ is the mass of the steering gear housing 86. $X_h$ is taken from terminal 176 as the negative input to summing point 138 to yield the algebraic sum ($X_r - X_h$) in the manner described above.

The output tire patch steering angle $Theta_{tp}$ at output terminal 114 is determined by tire patch torque $T_{tp}$ applied to the tire patches 178 (shown in FIG. 1) at terminal 180 multiplied by a control element $1/(BV_{tp} s + K_{tp})$ shown at block 182, where $K_{tp}$ and $B_{tp}$ are tire patch torsional stiffness and damping coefficient terms, respectively. The tire patch torque $T_{tp}$ at terminal 180 is determined by the difference, achieved via summing point 184, between the average dirigible wheel angle $Theta_w$ and the average output tire patch angle $Theta_{tp}$ multiplied by a control element ($B_{sw}$ s+$K_{sw}$) shown at block 186, where $K_{sw}$ and $B_{sw}$ are torsional stiffness and torsional damping coefficients, respectively, associated with torsional deflection of tire side walls 188 (again shown in FIG. 1) with respect to the dirigible wheels 80. Theta$_w$ is determined by the difference (achieved via summing point 190) between the torque $T_w$ applied to the dirigible wheels 80 and the tire patch torques $T_{tp}$, multiplied by a control element 1/($J_w$ $s^2$) shown at block 192, where $J_w$ is moment of inertia of the dirigible wheels 80.

The torque $T_w$ applied to the dirigible wheels 80 is determined by the force $F_r$ applied at the effective steering linkage radius (located at terminal 132) multiplied by a control element $R_w$ shown at block 194, where $R_w$ is the effective steering linkage radius of the portion 108 of the steering knuckles 100 defined above. The force $F_r$ is determined in three steps. First, (f $X_{sf}$) is subtracted from X, at summing point 196 with (f $X_{sf}$) having been obtained by multiplying (at block 198) the lateral motion $X_{sf}$ of the steering assembly sub-frame 94 present at terminal 200 by a coupling factor f between the steering assembly sub-frame 94 and mounting points 202 (shown in FIG. 1) for the lower control arms 106 and thus the dirigible wheels 80. Second, the product of Theta$_w$ and $R_w$ (obtained by multiplication at block 204) is subtracted from the algebraic sum ($X_r$–f $X_{sf}$) at summing point 206. Finally, this difference ($X_r$–f $X_{sf}$–Theta$_w$ $R_w$) is multiplied by a control element $K_r$ shown at block 208 to yield the rack forces $F_r$ at terminal 132, where $K_r$ is the stiffness of the connecting elements between the rack 88 and the dirigible wheels 80 (e.g., principally the stiffness of the portion 108 of the steering knuckles 100). $F_r$ is then returned to summing point 134 and the subsequent derivation of $X_r$ at terminal 124 is determined in the manner described above.

The balance of the block diagram 110 models the structural elements disposed in the path of reaction forces applied to the steering gear housing 86, and provides the lateral motion $X_{sf}$ of the steering assembly sub-frame 94 (at terminal 200) and the housing-to-sub-frame force $F_{hsf}$ (at terminal 172) mentioned above. Ultimately, the reaction force is applied to the mounting points 202 (at terminal 210) of the dirigible wheels 80 as a sub-frame reaction force $F_{sf}$. More particularly, $F_{sf}$ is determined by the product of a control element ($B_{sfmp}$ s+$K_{sfmp}$) shown at block 212 and $X_{sf}$ at terminal 200, where $K_{sfmp}$ and $B_{sfmp}$ are stiffness and series damping coefficient terms, respectively, associated with the interface between the steering assembly sub-frame 94 and the mounting points 202. $X_{sf}$ at terminal 200 is determined by the product of control element 1/($M_{sf}$ $s^2$+$B_{sf}$ s) shown at block 214, where $M_{sf}$ is the mass of the sub-frame as well as connected portions of the host vehicle's structure and $B_{sf}$ is damping associated with coupling the steering assembly sub-frame 94 to the structure, and an algebraic sum ($F_{hsf}$–$F_{sf}$) generated by summing point 216, where $F_{hsf}$ is the force applied to the steering assembly sub-frame 94 as the housing-to-sub-frame force located at terminal 172. $F_{hsf}$ is determined by the product of a control element ($B_{hsf}$S+$K_{hsf}$) shown at block 218, where $K_{hsf}$ and $B_{hsf}$ are stiffness and damping terms associated with the interface between the steering gear housing 86 and the steering assembly sub-frame 94, and an algebraic sum ($X_h$–$X_{sf}$) generated by summing point 220. The positive input to summing point 220, $X_h$, is taken from terminal 176 while the negative input, $X_{sf}$, is taken from terminal 200.

The following values and units for the various constants and variables mentioned above can be considered exemplary for a typical power steering system, and a conventional host vehicle on which it is employed:

1/(Btp s+$Kt_p$)=1/(20 s+8,000) [rad./in.–lb.]
B$s_w$ s+K$s_w$=30 s+500,000 [in.–lb./rad.]
1/($J_w$ $s^2$)=1/(8 $s^2$) [rad./in.–lb.]
1/($B_s$ s+$J_s$ $s^2$)=1/(0.1 s+.5 $s^2$) [rad./in.–lb.]
$R_w$=5 [in/rad.]
$K_k$=8,000 [lb./in.]
1/($M_r$ $s^2$+$B_r$ s)=1/(0.02 $s^2$+0.1 s) [in./lb.]
1/$R_p$=1/0.315 [in.–1]
K=500 [in.–lb.]
f=0.7 (dimensionless)
A=1.5 [in.$^2$] 1/($M_h$ $s^2$)=1/(0.05 $s^2$) [in./lb.]
$B_{hsf}$s+$K_{hsf}$=100 s+150,000 [lb/in.]
1/($B_{sf}$s+$M_{sf}$$s^2$)=1/(0.05 s+0.4 $s^2$) [in./lb.]
$B_{sfmp}$s+$K_{sfmp}$=10 s+20,000 [lb./in.]
$V_t$=12 [in.$^3$]
$B_e$=100,000 [lb./in.$^3$]
$K_c$=0.1 [in.$^5$/lb.–sec.]
$P_l$, $P_c$, $P_d$,=[lb./in.$^2$]
$X_r$, $X_h$, $X_{sf}$, $X_f$=[in.]
$F_{hsf}$, $F_h$, $F_{sf}$, $F_t$, $F_m$, $F_h$, $F_r$=[lb.]
T, $T_s$, $T_{tp}$=[in.–lb.]
$θ_s$, $θ_e$, $θ_p$, $θ_w$, $θ_{tp}$=[rad.]

It should be noted that the block diagram 110 is a minimal block diagram presented herein for enabling a basic understanding of dynamics of the accumulator enabled power steering system 10. In particular, a more complete representation would include various electronic resistance, electronic inductance, mass and stiffness elements associated with internal operation of the first valve 24a or the second valve 24b. It is believed herein however, that these factors can be controlled in an inner feedback control loop separate from the overall feedback loop implemented with reference to the torque transducer. Preferably the inner feedback control loop would be implemented with reference to the pressure signals $V_p$ representative of actual fluid pressure values present at the respective one of the first port 14a and the second port 14b as provided by the selected one of the first pressure transducer 30a and second pressure transducer 30b (e.g., with the other one assumed to be at reservoir pressure). This type of control techniques described in detail in the incorporated '254 patent. In addition of course, pertinent servo valve design and control technologies are fully described in the book entitled "Hydraulic Control Systems."

In passing however, it should be noted that functioning of the first valve 24a and the second valve 24b differs fundamentally from that of a common open-center control valve because the first valve 24a and the second valve 24b are fundamentally flow control devices whereas open-center control valves are pressure control devices. In fact, their version of a gain constant $K_q$' is actually a pressure gain constant with dramatically differing values that relate valve output pressures to input error angles. In any case, procedures for determining appropriate values for $K_q$ and $K_c$ as utilized herein are fully described in the book entitled "Hydraulic Control Systems." On the other hand, procedures for determining appropriate values for $K_{cf}$ over a range of input steering wheel torque and vehicle speed values are fully described in the incorporated '254 patent. Also, a description of procedures for evaluating stability criteria for power steering systems such as the accumulator enabled power steering system 10 as depicted in the block diagram 110 can be found in the incorporated '254 patent and so will not be repeated herein.

Finally, although the block diagram 110 includes a single set of valve 24a or 24b and pressure transducer 30a or 30b, this is exemplary only as it is clear that each set is alternately utilized depending upon the polarity of the applied torque signal $V_{sat}$. This requires electronic (e.g., hardware, software or software actuated firmware) switching means (not shown)

whereby the appropriate set of valve 24a or 24b and respective pressure transducer 30a or 30b.

Figure 8:
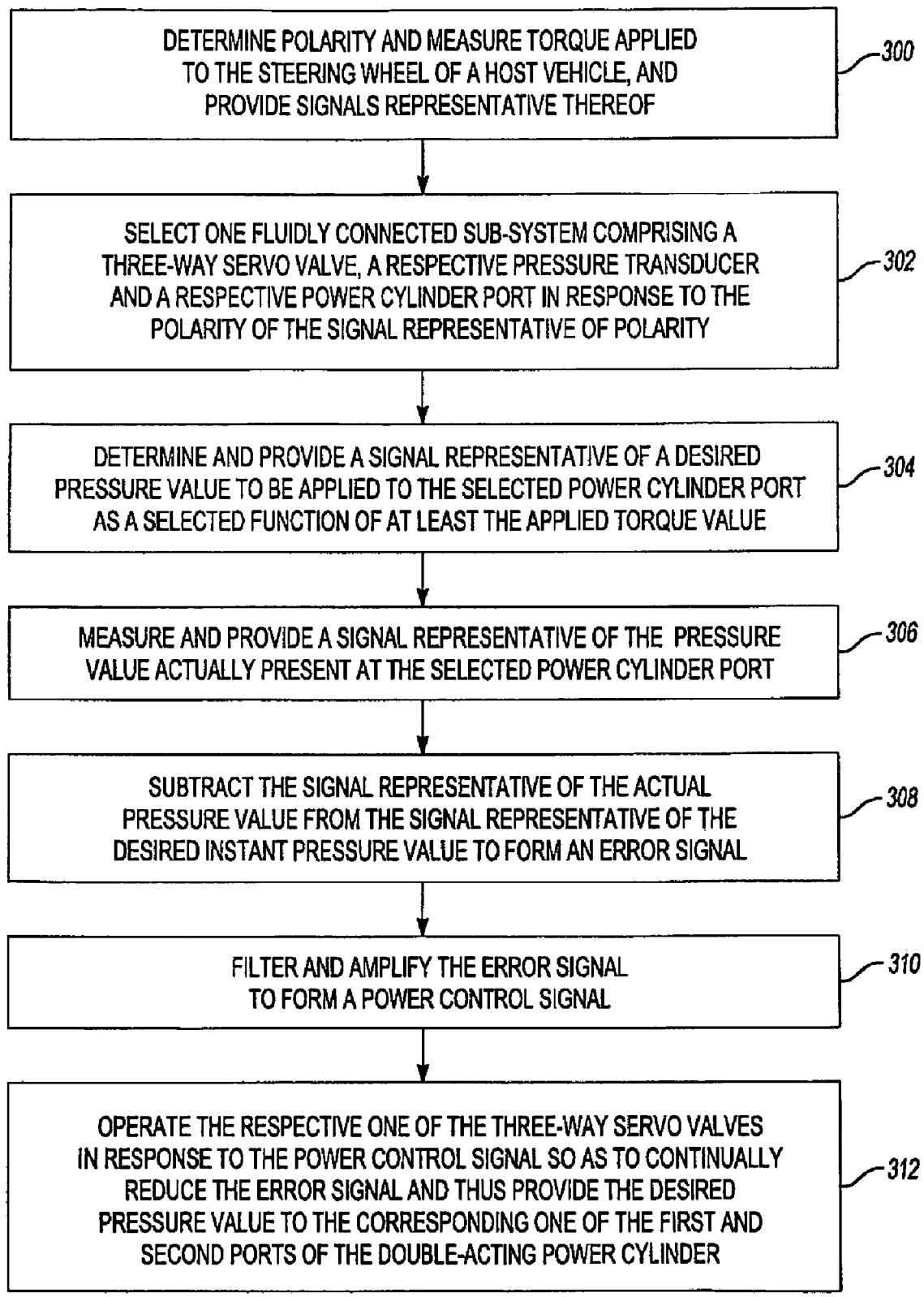
FIG. 8 is a flow chart depicting a method of control for the accumulator enabled power steering system of the present invention.

As depicted in the flow chart of FIG. 8, the present invention also includes a method for enabling an accumulator enabled power steering system, such as that described with respect to FIGS. 1-7. The method includes determining polarity and measuring torque applied to the steering wheel of a host vehicle, and providing signals representative thereof in step 300. The method includes selecting one fluidly connected sub-system comprising a three-way servo valve, a respective pressure transducer and a respective power cylinder port in response to the polarity of the signal representative of polarity in step 302. A signal representative of a desired pressure value to be applied to the selected power cylinder port as a selected function of at least the applied torque value is determined and provided in step 304. A signal representative of the pressure value actually present at the selected power cylinder port is measured and provided in step 306. The signal representative of the actual pressure value is subtracted from the signal representative of the desired instant pressure value to form an error signal in step 308. The error signal is filtered and amplified to form a power control signal in step 310. The respective one of the three-way servo valves is operated in response to the power control signal so as to continually reduce the error signal and thus provide the desired pressure value to the corresponding one of the first and second ports of the double-acting power cylinder in step 312.

Having described the invention, however, many modifications thereto will become immediately apparent to those skilled in the art to which it pertains, without deviation from the spirit of the invention. For instance, the first valve 24a and the second valve 24b could be formed with multiple holes defining input and return "ports" in place of the input groove 36 and return groove 40, thereby almost certainly lowering fabrication costs. Thus, such over-lapped valves could, albeit with possibly some degradation of performance, be used in place of the first valve 24a and the second valve 24b having the input groove 36 and return groove 40 as depicted in FIG. 2. Such modifications clearly fall within the scope of the invention. Alphanumeric identifiers in method claim steps are for ease of reference in dependent claims and do not signify a required sequence of performance unless otherwise indicated in the claims.

What is claimed is:

1. An accumulator enabled power steering system comprising:
   an accumulator;
   a reservoir;
   a power cylinder having a first port; and
   a pressure transducer operable to measure a pressure at said first port;
   a first valve having an input groove fluidly connected to the accumulator and a return groove fluidly connected to the reservoir, the first valve further including a first valve spool having an output groove fluidly connected to said first port;
   a controller operable to provide a power control signal to the first valve based upon an error signal, wherein the error signal is based upon a difference between a control function signal and the pressure at the first port, and wherein the control function signal is determined by a control algorithm in response to an applied torque signal;
   a second valve having an input groove fluidly connected to the accumulator and a return groove fluidly connected to the reservoir, the second valve further including a second valve spool having an output groove fluidly connected to a second port of the power cylinder, wherein said controller is operable to provide a power control signal to one of the first valve and the second valve based upon a polarity of the applied torque signal;
   a steering wheel torque sensor operable to provide the applied torque signal;
   a steering wheel coupled to the steering wheel torque sensor;
   a steering shaft coupled to the steering wheel and the steering wheel torque sensor; and
   a steering wheel motion direction sensor comprising:
      a shaft angle encoder disc coupled to the steering shaft; and
      a plurality of sensors, wherein one of the plurality of sensors is operable to count a passage of space while another of the plurality of sensors is operable to determine a desired direction of the space.

* * * * *